United States Patent [19]

Kurokawa et al.

[11] Patent Number: 5,792,533
[45] Date of Patent: Aug. 11, 1998

[54] ELECTROSTATIC CHARGING ROLLER

[75] Inventors: Junji Kurokawa, Yokohama; Takeshi Tabuchi, Kawaguchi, both of Japan

[73] Assignee: Ricoh Company, Ltd., Tokyo, Japan

[21] Appl. No.: 700,769

[22] Filed: Aug. 15, 1996

[30] Foreign Application Priority Data

Aug. 16, 1995 [JP] Japan .................................. 7-208912
Sep. 8, 1995 [JP] Japan .................................. 7-231846

[51] Int. Cl.$^6$ .............................. B29D 22/00; B32B 1/08
[52] U.S. Cl. .......................... 428/36.9; 399/176; 492/53; 492/56
[58] Field of Search ..................... 428/36.9; 399/176; 492/53, 56

[56] References Cited

U.S. PATENT DOCUMENTS 5,497,219  3/1996  Kurokawa et al. ................. 355/219
5,602,712  2/1997  Daifuku et al. .................... 361/225

FOREIGN PATENT DOCUMENTS

| | | |
|---|---|---|
| SHO 50-13661 | 5/1975 | Japan . |
| 58-194061 | 11/1983 | Japan . |
| 63-149668 | 6/1988 | Japan . |
| 1-205180 | 8/1989 | Japan . |
| 7-49602 | 2/1995 | Japan . |
| 7-64378 | 2/1995 | Japan . |
| 7-92774 | 3/1995 | Japan . |
| 7-281502 | 10/1995 | Japan . |

*Primary Examiner*—Mark Chapman
*Attorney, Agent, or Firm*—McDermott, Will & Emery

[57] ABSTRACT

An electrostatic charging roller having at least two layers; namely an elastic layer and a surface layer covering a surface of the elastic layer; wherein the surface layer contains low structure acetylene with a particle diameter of 44 to 60 mµ to improve uniformity in electrification by the electrostatic charging roller having a surface layer in which conductive particles and non-adhesive resin are dispersed therein. Also dependency of the electrostatic charging roller on humidity is suppressed to a lower level, which makes smaller fluctuation of the electrifying characteristics caused by changes in environmental conditions.

6 Claims, 7 Drawing Sheets

RESISTANCE $R = \dfrac{V}{I}$

FIG.12

ELECTROSTATIC CHARGING ROLLER

FIELD OF THE INVENTION

The present invention relates to an electrostatic charging roller used in a contact roller electrifier, and more particularly to an electrostatic charging roller comprising at least two layers; namely an elastic layer and a surface layer covering the elastic layer.

BACKGROUND OF THE INVENTION

In an image forming apparatus based on the conventional type of electronic photographing system, a corona discharger has widely been used as an electrifying means for homogeneously electrifying a surface of a photosensitive body. The corona discharger does not contact a photosensitive body and is little affected by a type of a photosensitive body nor by environment for its use, and can homogeneously electrify a photosensitive body at a specified electric potential.

However, the corona discharger is systematically complicated, ozone generated in association with electric discharge degrades a photosensitive body or other peripheral components. Also elimination of ozone has strongly been desired from a view point of environmental problem.

A contact roller electrifier has been developed to solve the disadvantageous problems related to the corona discharger as described above, but a contact roller electrifier easily generates non-uniformity in electrification, and load of a DC/AC superposed voltage has been required to eliminate non-uniformity in electrification.

So the present inventor examined in detail the causes of non-uniformity in electrification generated when only a DC voltage is loaded, and found that the non-uniformity in electrification is caused by the fact that rubber and carbon are distributed in the elastic layer, and that the non-uniformity in electrification generated when only a DC voltage is loaded can be eliminated by eliminating electric non-uniformity by replacing the rubber/carbon layer with epichlorohydrin rubber layer with intermediate resistance.

However, the electrostatic charging roller comprising an epichlorohydrin rubber elastic layer (with thickness from 1 to 5 mm) with intermediate resistance (in a range from $10^7$ to $10^9 \Omega \cdot cm$) has the practical problems ① that a surface of the roller is easily contaminated, and ② that it is substantially affected by environmental conditions, and for the reasons described above, a surface layer made of non-adhesive resin is required for covering the elastic layer.

As an electrostatic charging roller having a surface layer on an elastic layer for covering the elastic layer, there has been proposed, for instance, that with the surface layer containing N-alcoxymethylate nylon as disclosed in Japanese Patent Laid-Open Publication No. HEI 1-205180 "Component for Electrification" or that in which a polyamide resin (film thickness: 5 μm) surface layer or a fluorine resin-based surface layer containing carbon therein by 4% is provided on an epichlorohydrin rubber elastic layer, as disclosed in Japanese Patent Laid-Open Publication No. HEI 7-49602.

Figure 12:
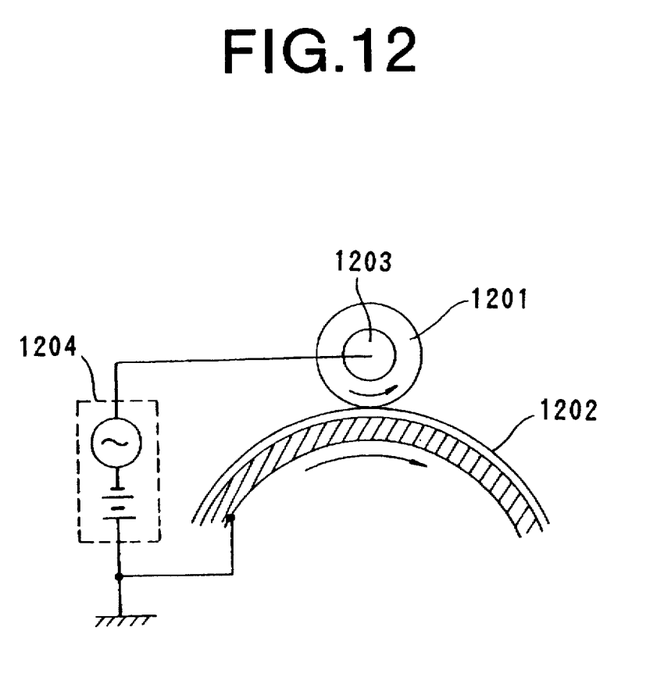
FIG. 12 is an explanatory view showing a method of using an electrostatic charging roller based on the conventional technology.

Also different from the corona discharger described above, there has been developed and put into practical use a new type of electrostatic charging roller in which an electrostatic charging roller 1201 is contacted to a photosensitive drum 1202 to rotate following the latter, and a surface of the photosensitive drum 1202 is electrified by loading a voltage a core metal of the electrostatic charging roller 1201 from a power source 1204. A voltage supplied from the power source 1204 may be low for the electrostatic charging roller 1201 as an electrifying means, and in that case a quantity of ozone generated in association with the electrifying processing is advantageously small. Also electrostatic absorption of dust associated with use of a corona electrode wire does not occur, and a high voltage power source is not required.

However, the electrostatic charging roller easily causes non-uniformity in electrification, and also the electrified potential largely changes according to changes in environmental conditions, and as far as this non-uniformity in electrification is concerned, the electrifying processing with an electrostatic charging roller is at present substantially inferior to that by a corona discharger.

To improve uniformity in electrification, Japanese Patent Laid-Open Publication No. SHO 63-149668 discloses the "Contact Electrifying Method" which can substantially improve the uniformity in electrification by superposing an AD voltage having an inter-peak voltage 2 times or more higher than the electrification start voltage ($V_{TH}$) generated when a DC current is loaded.

However, in the Japanese Patent Laid-Open Publication No. HEI 1-205180 described above, although the surface layer containing N-alcoxymethylate nylon is excellent in the non-adhesivity as well as resistance against environmental conditions, the film strength is low, so that the endurance as an electrostatic charging roller is disadvantageously low.

Also in the Japanese Patent Laid-Open Publication No. HEI 7-49602, although endurance of the electrostatic charging roller is excellent, the polyamide resin surface layer has large dependency on humidity, which makes it impossible to obtain stable uniformity in electrification, and also the fluorine resin-based surface layer containing carbon by 4% has poor dispersibility of carbon and fluorine resin, so that the uniformity in electrification is not sufficient.

In the "Contact Electrifying Method" disclosed in Japanese Patent Laid-Open Publication No. SHO 63-149668, as an AD voltage having an inter-peak voltage 2 times or more higher than the electrification start voltage ($V_{TH}$) generated when a DC voltage is loaded is superposed, AC power supply source is required in addition to a DC power supply source, which causes increase of cost of the apparatus itself, and further a large quantity of AC current not used for electrification of a photosensitive body is consumed, which not only increase of power cost, but also generation of a large quantity of ozone, and which in turn causes degradation of electrifying members and the photosensitive body and sometimes may cause an environmental pollution.

To solve the problems, to load a voltage to an electrostatic charging roller using only a DC power without using an AC power, the present inventor has proposed an electrostatic charging roller using epichlorohydrin rubber with intermediate electric resistance in the elastic layer. This proposal was made because the inventor examined the causes of non-uniformity in electrification generated when only a DC voltage is loaded and found that synthetic rubber and carbon are dispersed in the elastic layer, namely that the electric non-uniformity in the conductive elastic layer is due to dispersion fault of carbon and synthetic rubber, and the inventor proposes to eliminate the non-uniformity in electrification generated when only a DC voltage is loaded by replacing the carbon/synthetic rubber elastic layer in the electrostatic charging roller with an epichlorohydrin rubber layer with intermediate electric resistance.

Also when a DC voltage is loaded, voltage resistance of the roller layer is rather poor, but by using epichlorohydrin rubber with intermediate electric resistance in the elastic layer, the voltage resistance is remarkably improved as compared to a case of the conductive elastic layer based on the carbon/synthetic runner system based on the conventional technology. Furthermore a rubber hardness of the epichlorohydrin rubber is 40 (JISA), relatively higher as compared to other types of rubber, with small elastic distortion and high mechanical strength.

In a case of a conductive elastic layer comprising a carbon/synthetic dispersion system based on the conventional technology, it was possible to adjust the apparent electric resistance by adjusting a quantity of carbon added therein, but it was extremely difficult to realize an appropriate conductivity ($10^8 \Omega \cdot cm$) and excellent voltage resistance simultaneously. Furthermore, when viewed at the microscopic level, the electric resistance in a portion of carbon is largely different from that in a portion of synthetic rubber, and because of the characteristics, uniformity in electrification and voltage resistance are very poor. However, if conductive particles such as carbon are not used and epichlorohydrin rubber with intermediate electric resistance ($10^7$ to $10^8 \Omega \cdot cm$) is used for the elastic layer of an electrostatic charging roller, all the problems concerning the electric characteristics of the electrostatic charging roller are solved.

However, the electrostatic charging roller comprising a polarity synthetic rubber layer having the excellent electrical and mechanical characteristics with intermediate electric resistance which can uniformly electrify only with the load by the DC voltage was practically used as a roller electrifier for a copying machine, and while operation of the copying machine was down, the electrostatic charging roller and the photosensitive body were closely contacted to each other, and there occurred the problems that abnormal horizontal stripes appeared in the first sheet of image after a long down time, and that, when the electrostatic charging roller was used for a long time, toners adhere to the surface of roller, whereby the electrifying capability of the electrostatic charging roller lowered.

As conventional technologies relating to the present invention, there are the "Roller Electrifying Device" disclosed in Japanese Paten Laid-Open Publication No. SHO 58-194061, "Conductive Body Covering Roller for Electrification" disclosed in Japanese Examined Patent Publication No. SHO 50-13661, and "Components for Electrification" disclosed in Japanese Examined Patent Publication No. HEI 6-64393.

In the device disclosed in Japanese Patent Laid-Open Publication No. SHO 58-194061, a cleaning element is provided in adjacent to a surface of an electrostatic charging roller comprising a conductive elastic body, and a surface of the conductive elastic roller is covered with a non-adhesive film to eliminate contamination of the surface of the electrostatic charging roller with toner.

Japanese Examined Patent Publication No. SHO 50-13661 discloses that electrification can be executed by loading a low voltage when an electrostatic charging roller is covered with a conductive body comprising nylon or polyurethane, and also Japanese Examined Patent Publication No. HEI 6-64393 discloses that stable electric potential can be achieved without being affected by environmental conditions by using N-alcoxymethylate nylon for a surface layer of a component for electrification.

SUMMARY OF THE INVENTION

It is a first object of the present invention to improve uniformity of electrification by an electrostatic charging roller having a surface layer in which conductive particles and non-adhesive resin are dispersed.

Also, in an electrostatic charging roller with improved durability by providing the surface layer which is excellent in the non-adhesivity to a photosensitive body nor toner, it is a second object of the present invention to reduce fluctuation in electrifying characteristics due to changes in environmental conditions by suppressing dependency of resistance of an electrostatic charging roller on humidity to a low level.

It is a third object of the present invention to provide an electrostatic charging roller with improved durability by improving a surface of epichlorohydrin rubber with intermediate electric resistance into a better state not adhesive to a photosensitive body nor to toner.

It is a fourth object of the present invention to provide an electrostatic charging roller in which the electrifying characteristics changes little in association with changes in environmental conditions, namely an electrostatic charging roller with low dependency on temperature and humidity.

To solve the present inventions, the electrostatic charging roller according to the present invention comprises at least two layers, namely an elastic layer and a surface layer covering a surface of the elastic layer, and the surface layer contains a low structure acetylene black with the particle diameter in a range from 44 to 60 mμ.

Also, the electrostatic charging roller according to the present invention comprises at least two layers, namely an elastic layer and a surface layer covering a surface of the elastic layer, and the surface layer is made from a low structure acetylene black which is easily dispersed in methanol and a copolymer nylon resin which can be dissolved in methanol.

Also the electrostatic charging roller according to the present invention comprises at least two layers, namely an elastic layer and a surface layer covering a surface of the elastic layer, and the surface layer comprises a copolymer resin layer containing low structure acetylene black by 5 to 12 weight % and the elastic layer comprises an epichlorohydrin rubber layer.

Also the electrostatic charging roller according to the present invention includes a roller layer which comprises at least two layers, namely an elastic layer and a surface layer covering a surface of the elastic layer, and the relation between the resistance $R_1$ [$\Omega$] in the depth direction of only the elastic layer before formation of said surface layer thereon and the resistance $R_2$ [$\Omega$] in the depth direction of the roller layer after formation of the surface layer on said elastic layer is:

$$0.8 < R_2/R_1 \leq 4.0 \, [\Omega]$$

Also the electrostatic charging roller according to the present invention comprises at least two layers, namely an elastic layer and a surface layer covering a surface of the elastic layer, and a content of carbon black contained in the surface layer is larger than a content of carbon black contained in the elastic layer.

Also the electrostatic charging roller according to the present invention comprises at least two layers, namely an elastic layer and a surface layer covering a surface of the elastic layer, and a content of carbon black contained in nylon resin component in said surface layer is larger than a content of carbon black in epichlorohydrin rubber component in said elastic layer.

Also the electrostatic charging roller according to the present invention comprises at least two layers, namely an elastic layer and a surface layer covering a surface of the elastic layer, and the elastic layer comprises epichlorohydrin rubber and the surface layer comprises a copolymer nylon resin which can be dissolved in alcohol and carbon black.

Also the electrostatic charging roller according to the present invention comprises at least two layers, namely an elastic layer and a surface layer covering a surface of the elastic layer, and the elastic layer comprises a epichlorohydrin rubber layer with electric resistance in a range from $10^7$ to $10^9 \Omega \cdot cm$, and the surface layer comprises a copolymer nylon resin containing carbon black by 5 to 15 weight %.

Other objects and features of this invention will become understood from the following description with reference to the accompanying drawings.

BRIEF DESCRIPTION OF THE DRAWINGS

FIGS. 11A to 11C($i$) are explanatory views showing configuration of an electrostatic charging roller according to the present invention, an electrostatic charging roller as a control, and an electrostatic charging roller based on the conventional technology.

DESCRIPTION OF THE PREFERRED EMBODIMENTS

Next detailed description is made for the electrostatic charging roller according to the present invention with reference to the related drawings in the order of Embodiment 1, Embodiment 2, and Embodiment 3.

Figure 1:
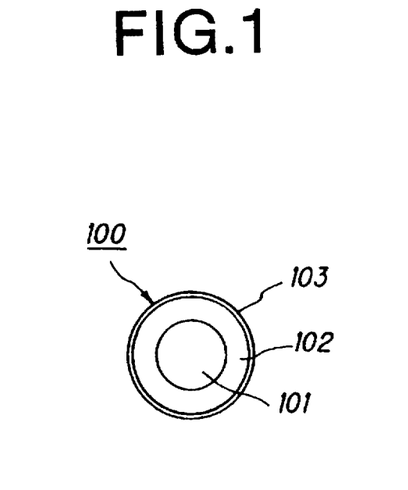
FIG. 1 is a block diagram showing an electrostatic charging roller according to the present invention.

FIG. 1 is a block diagram showing an electrostatic charging roller according to the present invention. A electrostatic charging roller 100 according to the present invention comprises a core metal 101 made of Sus with a diameter in a range from 6 to 10ϕ, and a roller layer comprised of an elastic layer 102 comprising epichlorohydrin rubber with a thickness from 1 to 5 mm provided on a peripheral surface of the core metal 101, and a surface layer 103 made from a carbon-dispersed non-adhesive resin (fluorine resin or nylon resin) with a thickness from 2 to 20 μm provided on a peripheral surface of the elastic layer 102. It should be noted that the carbon as shown in Table 1 below is as that to be contained in the surface layer 103.

TABLE 1

|  | SURFACE AREA ($m^2/g$) | PARTICLE DIAMETER (mμ) | VOLATILE COMPONENT (%) | PURE CARBON COMPONENT (%) | CHAIN-LIKE STRUCTURE |
|---|---|---|---|---|---|
| CARBON BLACK (BLACK PEARLS L) PRODUCED BY CABOT | 138 | 24 | 5.0 | 95.0 | |
| ACETYLENE BLACK (DENKABLACK) PRODUCED BY DENKI KAGAKU | 65 | 40 | 0.10 | 99.8 | HIGH STRUCTURE |
| ACETYLENE BLACK (HS-100) PRODUCED BY DENKI KAGAKU | 37 | 53 | 0.15 | 99.8 | LOW STRUCTURE |

At first, the epichlorohydrin rubber elastic layer 102 with a thickness of 3 mm is formed on the core metal 101 with a diameter of 8ϕ. The electric resistance is $1.2 \times 10^8 \Omega \cdot cm$, the rubber hardness is 42 (JISA), and an average roughness of surface $R_z$ is equal to 5.5 μm. The coating liquid as shown in Table 2 (A quantity of carbon dispersed therein: 8 to 12%, the carbon dispersed with a homogenizer or a ball mill) is prepared on a peripheral surface of the elastic layer 102, then the coating liquid is applied with a spray so that a thickness of the surface layer 103 will be 10 μm, thus the samples No. 1 to No. 6 being prepared.

TABLE 2

| No. | NAME OF RESIN | NAME OF CARBON | SOLVENT | DISPERSING METHOD | DISPERSIBILITY |
|---|---|---|---|---|---|
| 1 | FLUORINE RESIN (LUMICRONE, PRODUCED BY ASAHI GLASS) | BLACK PEARLS L (CABOT) | TOLUENE | BALL MILL, 1 HOUR | X |
| 2 | FLUORINE RESIN (LUMICRONE, PRODUCED BY ASAHI GLASS) | ACETYLENE BLACK, HIGH STRUCTURE (DENKA) | TOLUENE | HOMOGENIZER, 1 HOUR | X |
| 3 | FLUORINE RESIN (LUMICRONE, PRODUCED BY ASAHI GLASS) | ACETYLENE BLACK, LOW STRUCTURE (HS-100 DENKA) | TOLUENE | HOMOGENIZER, 20 MINUTES | O |
| 4 | NYLON RESIN (CM 8000, PRODUCED BY TORE) | BLACK PEARLS L (CABOT) | TOLUENE | HOMOGENIZER, 1 HOUR | X |
| 5 | NYLON RESIN (CM 8000, PRODUCED BY TORE) | ACETYLENE BLACK, HIGH STRUCTURE (DENKA) | METHANOL | HOMOGENIZER, 30 MINUTES | Δ |
| 6 | NYLON RESIN (CM 8000, PRODUCED BY TORE) | ACETYLENE BLACK, LOW STRUCTURE (HS-100 DENKA) | METHANOL | HOMOGENIZER, 10 MINUTES | ⊚ |

Figure 2:
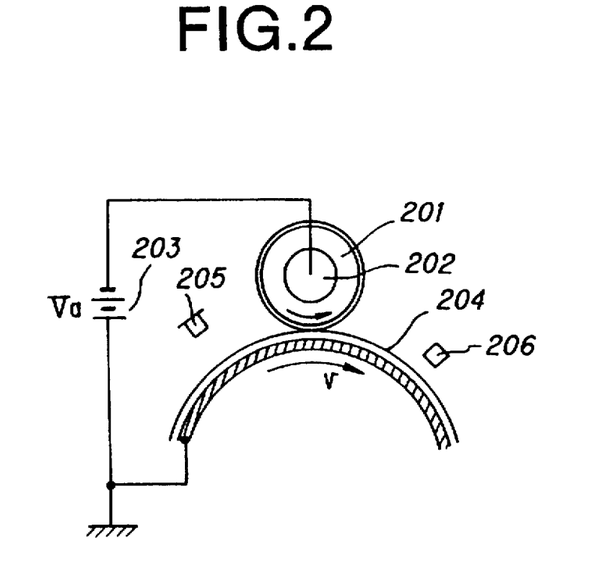
FIG. 2 is an explanatory view showing an experiment device for assessing the electrifying characteristics of an electrostatic charging roller.

FIG. 2 shows an experiment device used for assessment of the electrifying characteristics of an electrifying motor, and in this figure designated at the reference numeral 201 is an electrostatic charging roller which is an object for assessment, at 202 a core metal of the electrostatic charging roller 201, at 203 a power used to load a DC voltage Va to the core metal 202 of the electrostatic charging roller 201, at 204 a photosensitive drum, at 205 a quenching lamp, and at 206 a potentionimeter for measuring a electrified potential Vs on a surface of the photosensitive drum 204.

Next description is made for a method of assessing the electrifying characteristics of the electrostatic charging roller 201 using the experiment device shown in FIG. 2. At first, a DC voltage Va is loaded to the electrostatic charging roller 201 contacting and driven by the photosensitive drum 204 rotating at a linear velocity v, then the photosensitive drum 204 with electric charge having been removed by the electric charger removing lamp 205, and the electrified potential Vs of the photosensitive drum 204 is measured by the potentionimeter 206.

Figure 3:
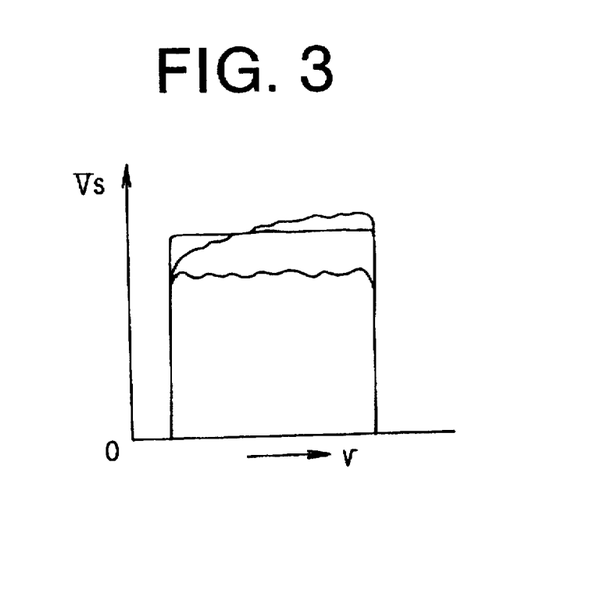
FIG. 3 is an explanatory view showing the electrifying characteristics chart for a result of measurement with the potentionimeter shown in FIG. 2.

FIG. 3 shows a chart for the electrifying characteristics obtained as a result of measurement by the potentionimeter 206, and rise of the electrified potential Vs, electrified potential Vs, and uniformity of the electrified potential Vs can be assessed from this electrifying characteristics chart.

Figure 4:
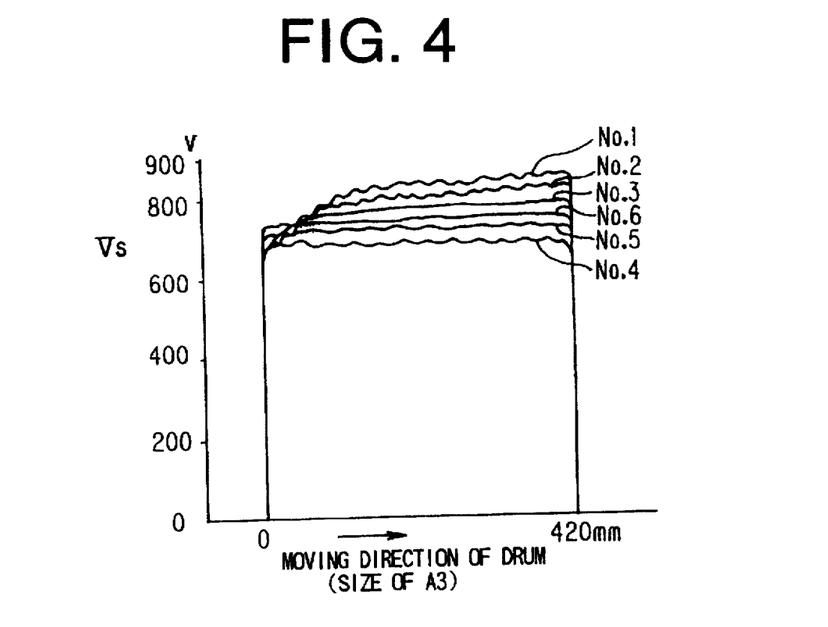
FIG. 4 is a chart for electrifying characteristics showing a result of assessment of the electrifying characteristics of Samples No. 1 to No. 6.

In FIG. 2, the photosensitive drum 204 comprises an OPC photosensitive drum (film thickness: 24 μm), the linear velocity v is equal to 180 mm/sec, and the loaded voltage Va is equal to −1.5 KV, and a result of assessment of the electrifying characteristics of the samples No. 1 to No. 6 is shown in FIG. 4 showing the electrifying characteristics chart and Table 3.

TABLE 3

| | ELECTRIFYING CHARACTERISTICS | | |
|---|---|---|---|
| | | CHARACTERISTICS | |
| SAMPLE | RISE | Vs | UNIFORMITY |
| No. 1 | X | −850 V | X |
| No. 2 | X | −850 V | X |

TABLE 3-continued

| | ELECTRIFYING CHARACTERISTICS | | |
|---|---|---|---|
| | | CHARACTERISTICS | |
| SAMPLE | RISE | Vs | UNIFORMITY |
| No. 3 | X | −780 V | O |
| No. 4 | O | 680 V | X |
| No. 5 | O | 730 V | Δ |
| No. 6 | O | 740 V | O |

Vs does not rise well in the fluorine resin system (samples No. 1 to No. 3), while it rises well and is stable in the nylon resin system (No. 4 to No. 8). This indicates that the nylon resin is more suited to form a film.

Uniformity of electrification well corresponds to dispersibility of a coating liquid for a surface layer, and it is largely affected by carbon. At first it was thought that carbon with smaller particle diameter better insures high dispersibility, but actually a contrary result was obtained.

As acetylene black has higher density (contains carbon more) as compared to carbon black and a smaller content of hydrogen, so that its conductivity is high (the electric resistance is small. The acetylene black has the feature that the chain-formed structure) grows well in it (high structure). For this reason it is possible to largely reduce electric resistance of a resin by adding a small quantity of acetylene black in it.

On the other hand, the HS-10 used in the samples No. 3 and No. 6 which showed high uniformity in electrification had a particle diameter in a range from 48 to 55 mμ, the structure does not grow well in it, and the length is short even if the structure grows therein (low structure). It seems that the features as described above are causes for excellent dispersibility and small increase in adhesivity when processed into a coating material (Refer to "Merits of High-Dispersibility Denkablack HS-100" published by Denki Kagaku Kabushiki Kaisha).

A coating liquid comprising low structure acetylene black (HS-100) which can easily be dispersed in methanol and copolymer nylon resin (CM800) which can be dissolved in methanol has extremely high dispersibility. For this reason, in the electrostatic charging roller No. 6 having a surface layer with a thickness of 10 μm formed by spraying the coating liquid onto a peripheral surface of an elastic rubber roller, uniformity in electrification is high, and at the same time non-adhesivity to OPC of the roller surface and toner are quite excellent.

As an electrostatic charging roller according to Embodiment 2 of the present invention, an epichlorohydrin rubber elastic layer with a thickness of 3 mm was formed on a core metal with a diameter of 8φ, and totally ten pieces of elastic roller were prepared. The rubber hardness was 41 (JISA), and the surface roughness $R_z$ was in a range from 5 to 7 μm.

5 types of coating liquid were prepared by adding acetylene black (HS-100, produced from Denki Kagaku Kabushiki Kaisha) by 2.5, 5, 8, 12 and 15 weight % in a methanol solution of copolymer nylon resin (CM4000 manufactured by Tore) and dispersing the acetylene black in each sample with a homogenizer for 10 minutes, then the 5 types of coating liquid were sprayed over a peripheral surface of the elastic roller respectively so that the average film thickness after dried would be 8 μm, and thus the samples No. 7 to No. 11 were prepared in the order of a quantity of acetylene black added therein.

The electrifying characteristics of these electrostatic charging rollers under three types of environmental conditions were measured with the experiment device shown in FIG. 2, and the electrified potential Vs on the OPC photosensitive drum (OPC film thickness: 25 μm) when Va was (−) 1.5 KV is shown in Table 2.

TABLE 4

| SAMPLE | ELECTRIFIED POTENTIAL Vs (Va = 1.5 KV) ENVIRONMENT | | |
|---|---|---|---|
| | 10° C. 15% | 23° C. 60% | 30° C. 90% |
| No. 7 (2.5 wt %) | 640 V | 800 V | 860 V |
| No. 8 (5 wt %) | 710 V | 850 V | 860 V |
| No. 9 (8 wt %) | 780 V | 860 V | 860 V |
| No. 10 (12 wt %) | 830 V | 880 V | 880 V |
| No. 11 (15 wt %) | 960 V | 950 V | 960 V |

Figure 5:
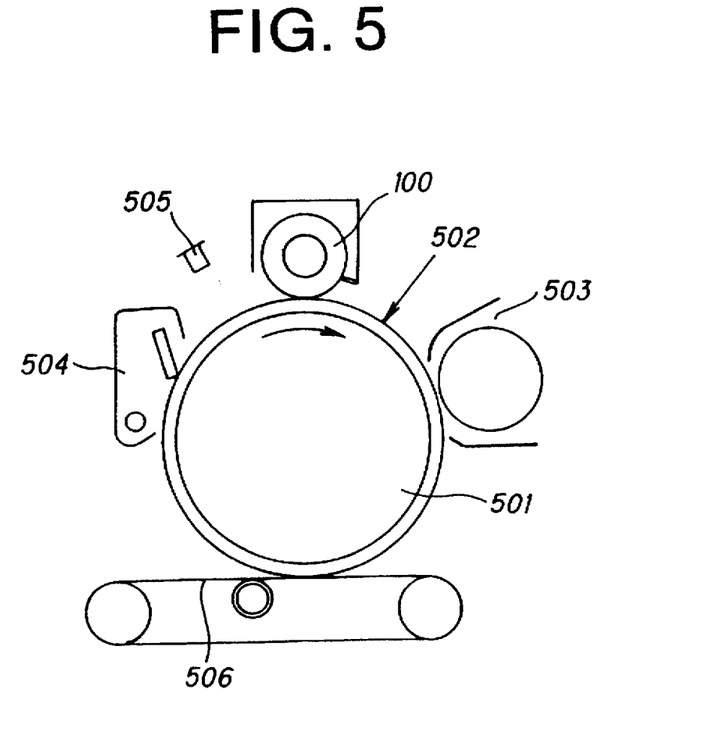
FIG. 5 is a general block diagram showing an image forming apparatus based on the roller electrifying system.

FIG. 5 shows general configuration of the image forming apparatus based on the roller electrifying system, and in this figure, designated at the reference numeral 100 is an electrostatic charging roller, at 501 a photosensitive drum, at 502 exposure of an image, at 503 a developing unit, at 504 a drum cleaner, and at 506 a transfer belt. This unit is used for checking out problems with images generated when the electrostatic charging roller 100 is actually used.

Figure 6:
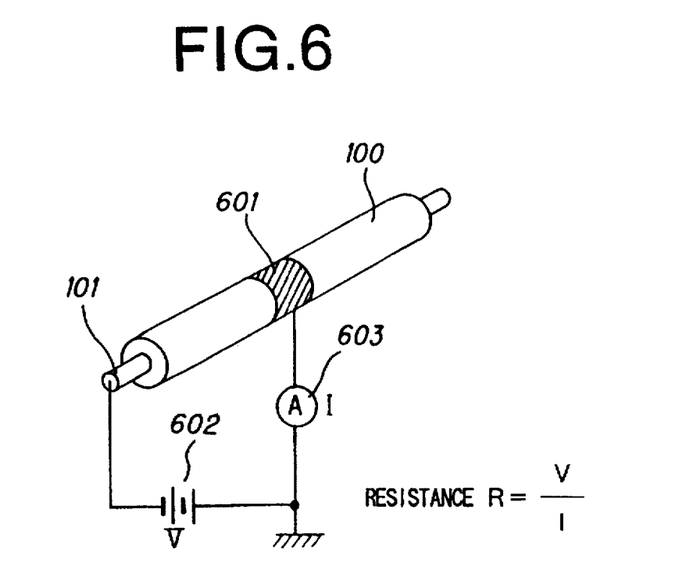
FIG. 6 is an explanatory view showing a device for measurement of electric resistance of a roller layer.

FIG. 6 shows a measurement device for electric resistance of a roller layer, and in this figure, designated at the reference numeral 100 is an electrostatic charging roller, at 101 a core metal, at 601 a tin foil electrode (with a width of 18 mm), at 602 a power for loaded voltage, and at 603 an ampere meter. It is assumed herein that the electrostatic charging roller 100 shows two types of state; ① an elastic roller before formation of a surface layer thereon (the state where the surface layer 103 has been removed from the electrostatic charging roller 100 according to the present invention), and ② an electrostatic charging roller after formation of the surface layer (an electrostatic charging roller according to the present invention).

It should be noted that, herein assuming that current values in ① and ② are $I_1$ and $I_2$ and the loaded voltage is 100 V, ① the electric resistance $R_1$ [Ω] in the depth direction of only the elastic layer before formation of a surface layer is expressed by the equation of $R_1=100$ [V]/$I_1$ [A] and ② the electric resistance $R_2$ [Ω] in the depth direction of the roller layer after formation of a surface layer thereon is expressed by the equation of $R_2=100$ [V]/$I_2$ [A].

From the measurement data on the electrified potential Vs under the three types of environmental conditions as shown in Table 4, the results (1) and (2) were obtained.

(1) Under the conditions of 10° C. and 15% of humidity (low temperature and low humidity), the electrified potential Vs tends to be low.

(2) Sample No. 11 shows unusually high electrified potential irrespective of environmental conditions.

A result of image test under the three types of environmental conditions (image check with the image forming apparatus shown in FIG. 5) is shown in Table 5.

TABLE 5

| | ENVIRONMENT | | | | | |
|---|---|---|---|---|---|---|
| | 10° C. 15% | | 23° C. 60% | | 30° C. 90% | |
| SAMPLE | IMAGE DENSITY | CONTAMINATION OF BASE GROUND | IMAGE DENSITY | CONTAMINATION OF BASE GROUND | IMAGE DENSITY | CONTAMINATION OF BASE GROUND |
| No. 7 (2.5 wt %) | X | ○ | ○ | ○ | ○ | ○ |
| No. 8 (5 wt %) | Δ | ○ | ○ | ○ | ○ | ○ |
| No. 9 (8 wt %) | ○ | ○ | ○ | ○ | ○ | ○ |
| No. 10 (12 wt %) | ○ | Δ | ○ | Δ | ○ | Δ |
| No. 11 (15 wt %) | Δ | X | Δ | X | Δ | X |

The results (3) and (4) were obtained from the image test under the three types of environmental conditions shown in Table 5.

(3) In Sample No. 7, the image density is low under low temperature and low humidity.

(4) In sample No. 11, abnormal images are generated under all the types of environmental conditions.

From the results described above, it can be understood that an appropriate quantity of acetylene black contained in a surface layer is in a range from 5 to 12 weight %.

Table 6 shows ① the electric resistance $R_1$ in the depth direction of an elastic layer before formation of a surface layer thereon, and ② the electric resistance $R_2$ of the roller layer of an electrostatic charging roller after formation of a surface layer thereon, each measured under the environmental conditions of 20° C. (temperature) and 40% (humidity). From the results shown in Table 6, the appropriate quantity of acetylene black contained in the surface layer in a range from 5 to 12 weight % corresponds to a specific value of $R_2/R_1$ relating to resistance values of each roller layer larger than 0.8 and equal to or smaller than 4.0 ($0.8<R_2/R_1 \leq 4.0$).

TABLE 6

| ELASTIC LAYER R1 | SAMPLE | ROLLER LAYER R2 | $R_2/R_1$ |
|---|---|---|---|
| $3 \times 10^6 \Omega$ | No. 7 (2.5 wt %) | $2.1 \times 10^7 \Omega$ | 7.0 |
| $3 \times 10^6 \Omega$ | No. 8 (5 wt %) | $1.2 \times 10^7 \Omega$ | 4.0 |
| $3.1 \times 10^6 \Omega$ | No. 9 (8 wt %) | $7.0 \times 10^6 \Omega$ | 2.25 |
| $2.9 \times 10^6 \Omega$ | No. 10 (12 wt %) | $2.4 \times 10^6 \Omega$ | 0.82 |
| $3.1 \times 10^6 \Omega$ | No. 11 (15 wt %) | $3.8 \times 10^5 \Omega$ | 0.12 |

Figure 7:
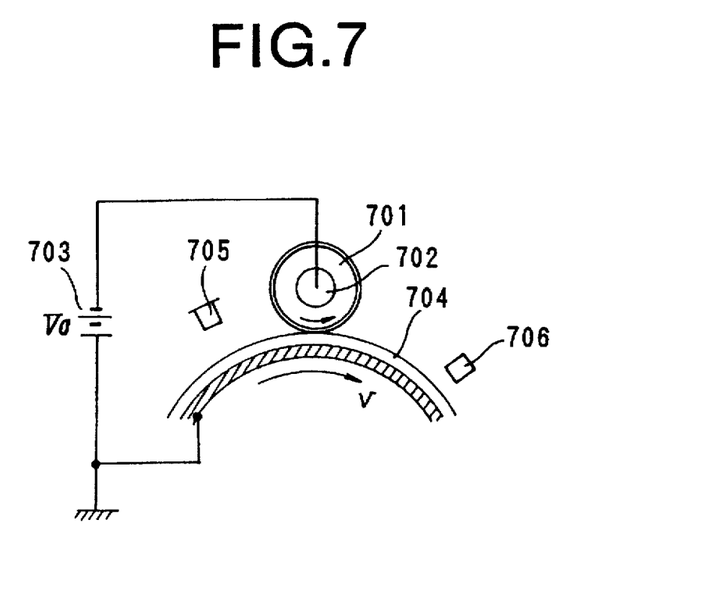
FIG. 7 is a block diagram showing an electrostatic charging roller experiment device for assessment of the electrifying characteristics of an electrostatic charging roller.

FIG. 7 shows an experiment device for an electrostatic charging roller for assessing the electrifying characteristics of an electrostatic charging roller, and in this figure, designated at the reference numeral 701 is an electrostatic charging roller as an object for assessment, at 702 a core metal of the electrostatic charging roller 701, at 703 a power for loading a DC voltage Va to the core metal 702 of the electrostatic charging roller 701, at 704 a photosensitive drum, at 705 a quenching lamp, at 706 a potentiometer for measuring the electrified potential Vs on a surface of the photosensitive drum 704.

Figure 8:
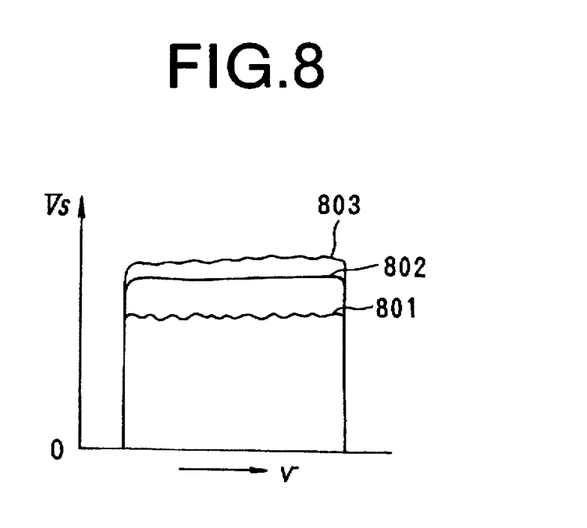
FIG. 8 is a chart for electrifying characteristics of electrified charge measured with the electrostatic charging roller experiment device shown in FIG. 1.

With the configuration described above, description is made for a method of assessing the electrifying characteristics of an electrostatic charging roller using the experiment device for electrification of a roller described above. At first, a DC voltage Va is loaded to the electrostatic charging roller 701 contacting the photosensitive drum 704 rotating at a linear velocity v and rotating in synchronism to the photosensitive drum 704, a surface of the photosensitive drum 704 with electric charge having been removed by the quenching lamp 705 is electrified to the electrified potential Vs, and the electrified potential Vs of the photosensitive drum 704 is measured with the potentiometer 706. From the electrifying characteristics chart as a result of measurement with this potentiometer 706, rise of Vs, electrified potential Vs, and uniformity of Vs can be assessed as shown in FIG. 8 (801 to 803). Characteristics of the electrostatic charging roller 701 against environmental conditions can be obtained by executing measurement of the above parameters with the experiment device as shown in FIG. 7 in a laboratory for environmental test.

Figure 9:
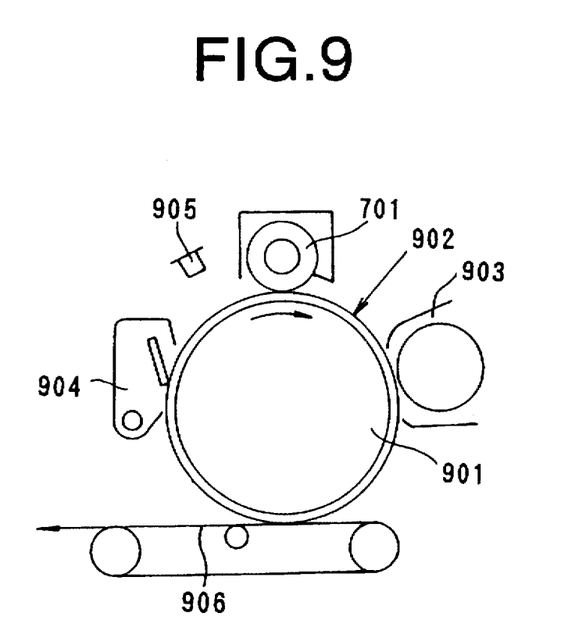
FIG. 9 is an explanatory view showing configuration of an image forming apparatus based on the roller electrifying system.
Figure 10:
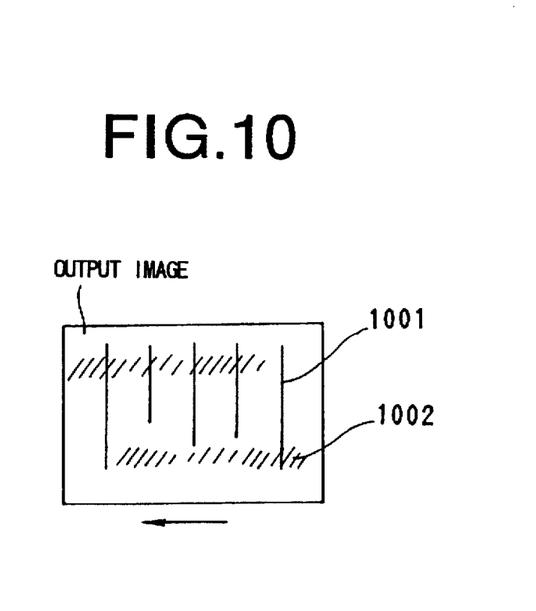
FIG. 10 is an explanatory view showing a method of checking non-uniformity in electrification by an electrostatic charging roller with output images therefrom.

FIG. 9 shows an image forming apparatus based on a roller electrifying method, and in this figure, designated at the reference numeral 701 is an electrostatic charging roller, at 901 a photosensitive drum, at 902 a laser beam as exposure data, at 903 a developing unit, at 904 a drum cleaner, at 905 a quenching lamp, and at 906 is a transfer belt, and this image forming apparatus is used as problems generated when the electrostatic charging roller is actually used. Concretely, as shown in FIG. 10, the output images are checked, and assessment is made for ① non-adhesivity of the electrostatic charging roller to a photosensitive body from the image 1001 with horizontal stripes (traces of a roller on the photosensitive body) and ② the adaptability for cleaning of a surface of the roller from contamination of images 1002 after the running test. Also assessment is made for ③ electric and mechanical endurance (voltage resistance and surface strength respectively) of the roller from other types of unusual images (not shown herein).

Figure 11A:
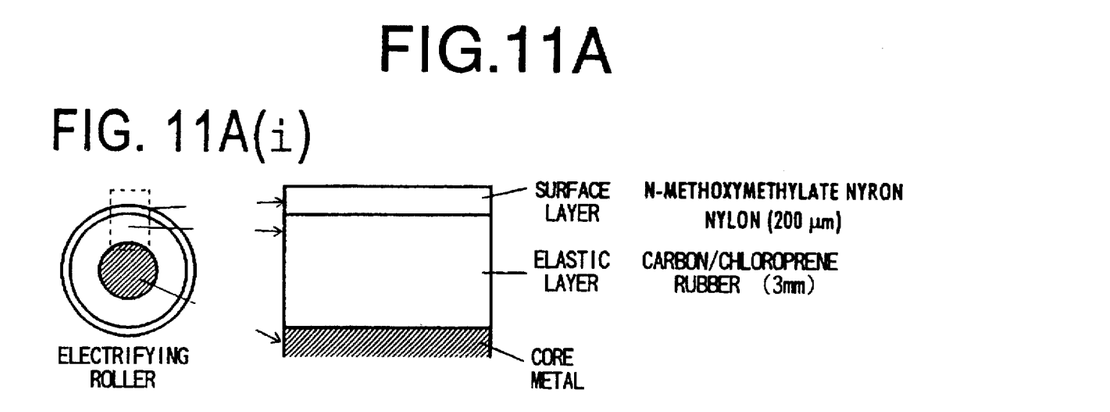
Figure 11B:
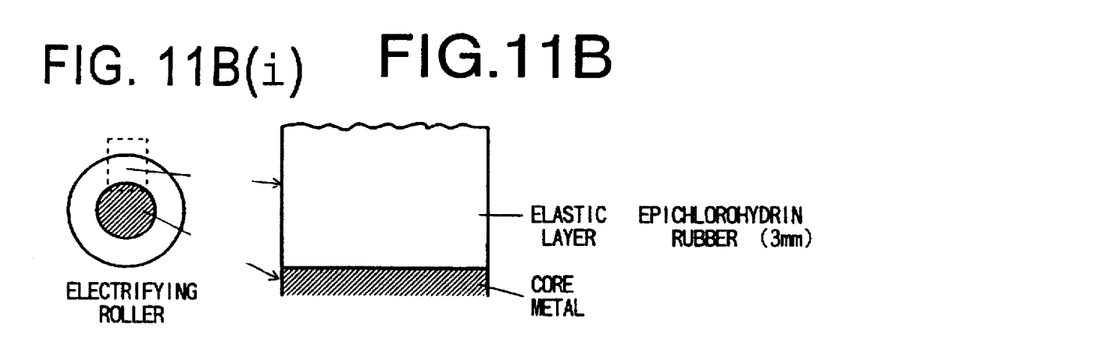
Figure 11C:
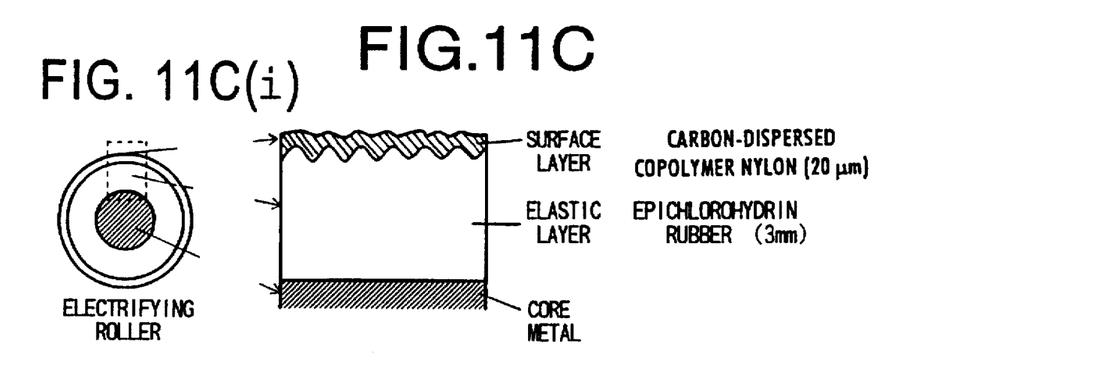

FIG. 11C shows configuration of the electrostatic charging roller according to the present invention, FIG. 11B shows configuration of an electrostatic charging roller as a control, and FIG. 11A shows configuration of a conventional type of electrostatic charging roller, and Table 7 shows characteristics of each of the electrostatic charging rollers shown in FIG. 11A to FIG. 11C.

TABLE 7

| | | CHARACTERISTICS | | | | | |
|---|---|---|---|---|---|---|---|
| | | ELECTRIFYING CHARACTERISTICS | | | SURFACE PROPERTY | | DURABILITY |
| ROLLER | | ELECTRIFIED POTENTIAL | UNI-FORMITY | CHANGE IN ENVIRONMENTAL CONDITIONS | NON-ADHESIVITY | ADAPTABILITY TO CLEANING | VOLTAGE RESISTANCE | FILM STRENGTH |
| EXAMPLE OF CONVENTIONAL TECHNOLOGY | FIG. 5A | ○ | X | Δ | ○ | ○ | X | Δ |
| CONTROL | FIG. 5B | ○ | ○ | Δ | X | X | ○ | X |
| PRESENT INVENTION | FIG. 5C | ○ | ○ | ○ | ○ | ○ | ○ | ○ |

FIG. 11A shows a conventional type of electrostatic charging roller (an embodiment in Japanese Patent Laid-Open Publication No. SHO 1-205180) in which an N-methoxymethylate nylon (Toredin EF-30T produced by Teikoku Kagaku) surface layer (with a thickness of 200 μm) is formed on a carbon-dispersed chloroprene rubber elastic layer (with a thickness of 3 mm and electric resistance of $10^4\Omega\cdot cm$), and there are some problems relating to uniformity in electrification and voltage resistance as shown in Table 7. However, the problems were solved by superposing an AC voltage to a DC voltage.

FIG. 11B shows an electrostatic charging roller as a control which is a single layer roller prepared by replacing the polyurethane rubber (with a thickness of 3 mm and electric resistance of $10^9\Omega\cdot cm$) shown in an embodiment in Japanese Examined Patent Publication No. SHO 50-13661 with epichlorohydrin rubber (with a thickness of 3 mm and electric resistance of $10^8\Omega\cdot cm$), and as shown in Table 7, the uniformity in electrification and voltage resistance were improved even when only a DC voltage was loaded. But the surface property is poor and can not be used for practical use.

FIG. 11C shows the electrostatic charging roller according to the present invention. In this electrostatic charging roller, a surface layer (with a thickness of 20 µm) made of carbon-dispersed copolymer nylon resin is provided on an epichlorohydrin rubber elastic layer (with a thickness of 3 mm, and electric resistance of $10^8\Omega\cdot cm$), and as shown in Table 7, the resistance against environmental conditions and surface property could substantially be improved keeping the electrifying characteristics of the electrostatic charging roller (FIG. 11B) as a control unchanged. Detailed description of made for the concrete example.

At first, an epichlorohydrin rubber elastic layer with a thickness of 3 mm was formed on a core metal with a diameter of 8φ, and then 6 weight portions of copolymer nylon CM 4000 (produced by Tore) and 0.6 weight portion of carbon black (produced by Cabot Inc.) were dissolved in 100 weight portions of methanol, and mixture was applied with a spray onto a surface of said elastic layer so that an average film thickness after dried on the surface layer is 20 µm, thus Sample No. 1 being obtained.

Then Samples as control No. 1 to 3 were prepared as described above. A thickness of each of the elastic layer and surface layer is the same as that in Sample 1.

Sample as control 1: A nylon resin surface layer is provided on an EPDM/carbon-dispersed elastic layer.

Sample as control 2: A nylon/carbon (5 weight %) is provided on the EPDM/carbon (15 weight %) dispersed elastic layer.

Sample as control 3: A nylon resin surface layer is provided on an epichlorohydrin rubber elastic layer.

Then the electrifying characteristics and resistance against environmental conditions of Sample No. 1 as well as of Samples as control No. 1 to No. 3 each as a control were measured with the experiment device shown in FIG. 7. The result is shown in Table 8.

As clearly understood from the result shown in Table 8, as not carbon-dispersed synthetic rubber but epichlorohydrin rubber with excellent ion conductivity is used as an elastic layer in the electrostatic charging roller (Sample 1) according to the present invention, the uniformity in electrification is excellent. Although the epichlorohydrin rubber with intermediate electric resistance not containing carbon therein is easily affected by temperature and humidity, it is covered with a carbon-dispersed nylon resin surface layer, so that fluctuation according to changes in environmental conditions can be suppressed.

Also as a nylon resin not adhesive to OPC nor to toner is used for the surface layer, the adaptability to cleaning and endurance are advantageous. Furthermore to improve the resistance against changes in environmental conditions, in the present invention, carbon black is dispersed in the surface layer, which makes the surface layer harder to be affected by humidity. Namely in the electrostatic charging roller (sample 1) according to the present invention in which a content of carbon black contained in a resin component of the surface layer is larger than a content of carbon black in a rubber component of the elastic layer, the resistance against changes in environmental conditions is more excellent as compared to that in Samples as control No. 1 to No. 3 each not satisfying the condition described above.

Then, at first a epichlorohydrin rubber elastic layer was formed on a core metal with a diameter of 8φ so that an outer diameter of the roller is around 16φ. The electric resistance of the elastic layer was $1.5\times10^8\Omega\cdot cm$, and the rubber hardness was 42 (JISA).

Then this elastic roller was mechanically polished so that a thickness of the elastic layer would be 3 mm and an average roughness of the surface measured at 10 points Rd would be 6 µm, and an elastic roller with a diameter of 14φ was prepared.

Then 5 types of coating liquid were prepared by adding carbon black (BLACK PEARLS L, produced by Cabot Inc.) by 2.5, 5, 10, 15, and 20 weight % into a methanol solution of copolymer nylon resin (Dyanamid T 170, produced by Dicel Hules Inc.) containing Nylon 12.

Each of the coating liquid was applied with a spray onto the elastic layer so that an average film thickness on the surface layer after dried would be in a range from 8 to 10 µm, thus Samples No. 2 to No. 6 being obtained in the order of a quantity of added carbon black.

The electrifying characteristics of the Samples No. 2 to No. 6 under the three types of environmental conditions (temperature of 10° C. and humidity of 15%; temperature of 23° C. and humidity of 60%; and temperature of 30° C. and humidity of 90%) was measured with the experiment device for a roller electrifying device shown in FIG. 7, and the electrified potential of the OPC photosensitive drum 704 when Va was −1.5 KV was as shown in Table 9. Also the image characteristics, running and durability of Samples No.

TABLE 8

| | ELECTRIFIED POTENTIAL (23° C. 60%) | UNIFORMTY, VOLTAGE RESISTANCE | WIDTH OF CHANGE IN ENVIRONMENTAL CONDITIONS → | (CHARACTERISTICS UNDER HIGH TEMPERATURE AND HIGH HUMIDITY) − (CHARACTERISTICS UNDER LOW TEMPERATURE AND LOW HUMIDITY) |
|---|---|---|---|---|
| SAMPLE 1 | 800 V | ○ | 80 V | CHANGE IN ENVIRONMENTAL CONDITIONS, MINIMUM |
| CONTROL 1 | 850 V | X | 120 V | DEPENDENCY ON HUMIDITY, LARGE |
| CONTROL 2 | 820 V | Δ | 100 V | DEPENDENCY ON HUMIDITY, LARGE |
| CONTROL 3 | 700 V | ○ | 230 V | DEPENDENCY ON TEMPERATURE AND HUMIDITY, LARGE IN BOTH |

2 to No. 6 were assessed with the image forming apparatus shown in FIG. 9, and the result as shown in Table 9 was obtained.

tive body does not lack and electrified potential does not below lower even under low humidity.

TABLE 9

| | CHARACTERITICS | | | | | |
|---|---|---|---|---|---|---|
| | ELECTRIFYING CHARACTERISTICS | | | IMAGE CHARACTERISTICS | | ADAPTABILITY TO |
| SAMPLE | 10° C. 15% | 23° C. 60% | 30° C. 90% | IMAGE DENSITY | CONTAMINATION OF BASE GROUND | CLEANING AND DURABILITY |
| 2 (2.5 wt %) | 630 V | 800 V | 860 V | X | ○ | ○ |
| 3 (5 wt %) | 700 V | 840 V | 860 V | Δ | ○ | ○ |
| 4 (10 wt %) | 780 V | 860 V | 860 V | ○ | ○ | ○ |
| 5 (15 wt %) | 840 V | 880 V | 890 V | ○ | Δ | Δ |
| 6 (20 wt %) | 960 V | 980 V | 970 V | ○ | X | X |

As clearly shown in Table 9, the characteristics of electrostatic charging rollers in which carbon was added in a range from 5 to 15 weight % is excellent. When the percentage is 2.5 weight % or less, electrified potential under low temperature and low humidity becomes lower. The reason seems to be that the electric resistance of the surface layer becomes higher under low humidity. Also in a case where the percentage was 20 weight % or more, high electrified potential was measured under all types of environmental conditions, but also charge because of charge injection was included, and non-uniformity in electrification was remarkable, which made it impossible to obtain a good image. Furthermore, the adaptability to cleaning and durability are rather poor.

As described above, in the electrostatic charging roller according to the present invention, low structure acetylene black with a particle diameter in a range from 44 to 60 mμ is used in the surface layer, which makes it possible to uniformly adjust the electric resistance of the surface layer, thus uniformity in electrification being improved. Namely, it is possible to improve uniformity in electrification of an electrostatic charging roller having a surface layer based on a conductive particle/non-adhesive resin dispersed system.

Also in the electrostatic charging roller according to the present invention, as the surface layer is prepared with low structure acetylene black which is easily dispersed in methanol and a copolymer nylon resin which can be dissolved in methanol, it becomes possible to uniformly adjust electric resistance of the surface layer with uniformity in electrification improved, and also it becomes possible to form uniform surface layer with extremely excellent dispersibility and electric uniformity, and in addition as the nylon resin is well adapted to formation of a film, non-adhesivity to OPC or toner on a surface of a roller becomes improved.

Also in the electrostatic charging roller according to the present invention, acetylene black is contained in the surface layer by 5 to 12 weight %, so that dependency of the electric resistance on humidity is suppressed to a low level, and always stable electrified potential an be obtained under any environmental conditions, and further the elastic layer comprises epichlorohydrin rubber with high ion conductivity, so that uniformity in electrification is very high.

Also in the electrostatic charging roller according to the present invention, the elastic layer comprises epichlorohydrin rubber with the electric resistance of $10^8 \Omega \cdot cm$, so that the voltage resistance is excellent. Also electric resistance of the surface layer is kept within less than 10 like that of the elastic layer, so that electrified potential of the photosensitive body does not lack and electrified potential does not below lower even under low humidity.

Also in the electrostatic charging roller according to the present invention, as a content of carbon black in the surface layer is larger than that of carbon black in the elastic layer, so that dependency of electric resistance on humidity is suppressed to a low level and fluctuation of electrifying characteristics caused by change in environmental conditions can be made smaller.

Also in the electrostatic charging roller according to the present invention, as a content of carbon black in a nylon resin component of the surface layer is larger than that in an epichlorohydrin rubber component of the elastic layer, in other words, as the elastic layer has a small carbon content and at the same time is ion-conductive, it is easily affected by temperature or humidity, but as a surface of the elastic layer is covered with non-adhesive resin based on carbon-dispersed system, the electrostatic charging roller itself is hardly affected by humidity, and fluctuation of the electrifying characteristics in association with changes in environmental conditions can be suppressed to a low level.

Also in the electrostatic charging roller according to the present invention, the elastic layer comprises epichlorohydrin rubber, while the surface layer comprises copolymer nylon resin which can be dissolved in alcohol and carbon black, its non-adhesivity to OPC and toner is excellent, and the adaptability to cleaning and durability are improved. Also as epichlorohydrin rubber with high ion-conductivity is used, its uniformity in electrification is very high.

Also in the electrostatic charging roller according to the present invention, the elastic layer comprises an epichlorohydrin rubber layer with the electric resistance of $10^7$ to $10^9 \Omega \cdot cm$, and the surface layer comprises copolymer nylon resin containing carbon black by 5 to 15 weight % therein, so that the dependency of electric resistance on humidity is suppressed to a low level, which makes it possible to always obtain stable electrified potential. The voltage resistance is also excellent.

This application is based on Japanese patent application No. HEI 7-231846 filed in the Japanese Patent Office on Sep. 8, 1995 and Japanese patent application No. HEI 7-208912 filed in the Japanese Patent Office on Aug. 16, 1995, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A substantially cylindrical electrostatic charging roller including a roller layer comprising at least two layers, namely an elastic layer and a surface layer covering said elastic layer; wherein the relation between the resistance $R_1$ ($\Omega$) in the radial direction of only the elastic layer before formation of said surface layer thereon and the resistance $R_2$ ($\Omega$) in the radial direction of the roller layer after formation of the surface layer on said elastic layer is:

$$0.8 < R_2/R_1 \leqq 4.0 \, (\Omega).$$

2. An electrostatic charging roller according to claim 1; wherein said elastic layer is made of epichlorohydrin rubber.

3. An electrostatic charging roller comprising at least two layers, namely an elastic layer and a surface layer covering said elastic layer; wherein a content of carbon black contained in said surface layer is larger than a content of carbon black contained in said elastic layer.

4. An electrostatic charging roller comprising at least two layers, namely an elastic layer and a surface layer covering said elastic layer; wherein a content of carbon black contained in a nylon resin component in said surface layer is larger than a content of carbon black in an epichlorohydrin rubber component in said elastic layer.

5. An electrostatic charging roller comprising at least two layers, namely an elastic layer and a surface layer covering said elastic layer; wherein said elastic layer is made of epichlorohydrin rubber and said surface layer is made of a copolymer nylon resin, which can be dissolved in alcohol, and a carbon black.

6. An electrostatic charging roller comprising at least two layers, namely an elastic layer and a surface layer covering said elastic layer; wherein said elastic layer comprises an epichlorohydrin rubber layer with an electric resistance in a range from $10^7$ to $10^9 \Omega \cdot cm$ and said surface layer comprises a copolymer nylon resin containing carbon black by 5 to 15 weight %.

* * * * *